2,721,215

DIPHENYLACETYL DIAMINES

Moses Wolf Goldberg, Upper Montclair, and Sidney Teitel, East Paterson, N. J., assignors to Hoffmann-La Roche Inc., Nutley, N. J., a corporation of New Jersey No Drawing. Application June 12, 1952,
Serial No. 293,212

2 Claims. (Cl. 260—558)

This invention relates to novel compounds useful as spasmolytics, broncholytics, and vasodilators. Our novel compounds are $N^1$-diphenylacetyl-$N^1,N^2,N^2$-triloweralkyl-1-phenylethylenediamines and $N^1$-diphenylacetyl-$N^1,N^2,$-$N^2$-triloweralkyl-1-phenyl-1,2-propanediamines wherein the alkyl radicals may be the same or different, and salts of these diamines including acid addition salts and quaternary ammonium salts thereof. The free bases are readily made, as shown hereinafter, by neutralizations of the corresponding salts.

The following examples present methods for the preparation of our novel compounds. These are merely illustrative and it will be understood that other compounds embraced in our statement of invention may be similarly prepared. All melting points set forth are corrected.

EXAMPLE 1

$N^1$-diphenylacetyl-$N^1,N^2$-dimethyl-$N^2$-isopropyl-1-phenyl-ethylenediamine A solution of 128 g. (1.06 mole) of styrene oxide and 126 g. (2.13 mole) of isopropylamine was heated in a sealed vessel at 90° for 18 hours. After cooling, the solid reaction mass was crystallized from ether-petroleum ether, to give 144 g. of 1-phenyl-2-isopropylaminoethanol, M. P. 90°.

To 110 g. (0.61 mole) of this secondary amine, dissolved in 70 ml. (1.6 mole) of 90 per cent formic acid, were added 60 ml. (0.07 mole) of 36 per cent formaldehyde. The solution was stirred at 45°–55° until carbon dioxide evolution ceased (1 hour). It was then refluxed for 3 hours, taken to dryness in vacuo, and the residue made strongly alkaline with NaOH and extracted with ether. The ether extract, after washing with water and drying with sodium sulfate, was concentrated and the residual oil fractionated, to give 105 g. of 1-phenyl-2-(methylisopropylamino)ethanol, B. P. $_{0.7}$ 99°–102°.

To 75 g. (0.39 mole) of 1-phenyl-2-(methylisopropylamino)ethanol dissolved in 150 ml. chloroform, was added, while cooling and stirring, a solution of 85 ml. (1.16 mole) of purified thionyl chloride in 50 ml. chloroform, so that the reaction temperature never rose above 4°. When the addition was completed (2 hours) the solution was stirred at 4° for an additional 3 hours. The chloroform and excess of thionyl chloride were then removed in vacuo at a bath temperature not exceeding 40°. The gummy residue was triturated with ether and then crystallized from acetone, to give 64 g. of the hydrochloride of 1-phenyl-1-chloro-2-(methylisopropylamino)ethane, M. P. 125°–127°.

7.5 g. (0.03 mole) of the hydrochloride of 1-phenyl-1-chloro-2-(methylisopropylamino)ethane and 50 ml. of a 26 per cent solution of methylamine in absolute methanol were heated in a sealed vessel at 120° for 18 hours. The reaction mixture was evaporated to dryness, the residue made alkaline with aqueous sodium hydroxide and extracted with ether. The ether extract was washed with water, dried over sodium sulfate and the ether distilled off. To the residual basic oil was added a 20 per cent solution of hydrogen bromide in absolute methanol until the solution obtained was acid to Congo red paper. The solution was taken to dryness and the amorphous solid thus obtained was crystallized from methanol-acetone-ether, giving 8.2 g. of the dihydrobromide of $N^1,N^2$-dimethyl-$N^2$-isopropyl-1-phenylethylenediamine, M. P. 161°–163°.

3.7 g. (0.01 mole) of the dihydrobromide of $N^1,N^2$-dimethyl-$N^2$-isopropyl-1-phenylethylenediamine was dissolved in water, the solution made alkaline with sodium hydroxide and extracted with ether. The ether extract was washed with water, dried with sodium sulfate and the ether distilled off, leaving the diamine as a colorless oil. To the latter, dissolved in 60 ml. of dry pyridine, was added a solution of 3.2 g. (0.014 mole) of diphenylacetyl chloride in 20 ml. of dry benzene. After refluxing for 3 hours, the solution was evaporated to dryness. The gummy residue was made alkaline with aqueous sodium carbonate and extracted with ether. The ether extract was washed with water, dried with sodium sulfate and saturated with dry hydrogen bromide gas. A gum precipitated out. The ether was distilled off and the residue crystallized from isopropanol-ethyl acetate-ether to give 3.2 g. of the hydrobromide of $N^1$-diphenylacetyl-$N^1,N^2$ - dimethyl - $N^2$ - isopropyl - 1 - phenyl - ethylenediamine, M. P. 171°–172°.

EXAMPLE 2

$N^1$ - diphenylacetyl - $N^1$ - ethyl - $N^2$ - isopropyl - $N^2$-methyl - 1 - phenylethylenediamine 7.5 g. (0.03 mole) of the hydrochloride of 1-phenyl-1-chloro - 2 - (methylisopropylamino)ethane (preparation shown in Example 1) and 50 ml. of a 12 per cent solution of ethylamine in benzene were heated in a sealed vessel at 120° for 18 hours. The reaction mixture was evaporated to dryness, the residue made alkaline with aqueous sodium hydroxide and extracted with ether. The ether extract was washed with water, dried over sodium sulfate and the ether distilled off. To the residual basic oil was added a 20 per cent solution of hydrogen bromide in absolute methanol until the solution obtained was acid to Congo red paper. The solution was taken to dryness and the amorphous solid thus obtained was crystallized from ethanol-acetone-ether, giving 5.2 g. of the dihydrobromide of $N^1$-ethyl-$N^2$-isopropyl-$N^2$-methyl-1-phenylethylenediamine, M. P. 188°–190°.

3.8 g. (0.01 mole) of the dihydrobromide of $N^1$-ethyl-$N^2$-isopropyl-$N^2$-methyl-1-phenylethylenediamine was dissolved in water, the solution made alkaline with sodium hydroxide and extracted with ether. The ether extract was washed with water, dried with sodium sulfate and the ether distilled off, leaving the diamine as a colorless oil. To the latter, dissolved in 60 ml. of dry pyridine, was added a solution of 3.2 g. (0.014 mole) of diphenylacetyl chloride in 20 ml. of dry benzene. After refluxing for 3 hours, the solution was evaporated to dryness. The gummy residue was made alkaline with aqueous sodium carbonate and extracted with ether. The ether extract was washed with water, dried with sodium sulfate and saturated with dry hydrogen bromide gas. A gum precipitated out. The ether was distilled off and the residue crystallized from acetone-ether to give 3.7 g. of crystalline hydrobromide of $N^1$-diphenylacetyl-$N^1$-ethyl-$N^2$-isopropyl-$N^2$-methyl-1-phenylethylenediamine, M. P. 160°–161°.

EXAMPLE 3

$N^1$-diphenylacetyl-$N^1$-$N^2$-diisopropyl-$N^2$-methyl-1-phenylethylenediamine 7.5 g. (0.03 mole) of the hydrochloride of 1-phenyl-1-chloro - 2 - (methylisopropylamino)ethane (preparation shown in Example 1) and 25 ml. of isopropylamine in 20 ml. of absolute methanol were heated in a sealed vessel at 120° for 18 hours. The reaction mixture was evaporated to dryness, the residue made alkaline with aqueous sodium hydroxide and extracted with ether. The ether extract was washed with water, dried over sodium sulfate and the ether distilled off. To the residual basic oil was added a 20 per cent solution of hydrogen bromide in absolute methanol until the solution obtained was acid to Congo-red paper. The solution was taken to dryness and the amorhpous solid thus obtained was crystallized from methanol-acetone-ether, giving 8.5 g. of dihydrobromide of $N^1,N^2$-diisopropyl-$N^2$-methyl-1-phenylethylenediamine, M. P. 215°–217°.

4.0 g. (0.01 mole) of the dihydrobromide of $N^1,N^2$-diisopropyl - $N^2$ - methyl-1-phenylethylenediamine was dissolved in water, the solution made alkaline with sodium hydroxide and extracted with ether. The ether extract was washed with water, dried with sodium sulfate and the ether distilled off, leaving the diamine as a colorless oil. To the latter, dissolved in 60 ml. of dry pyridine, was added a solution of 3.2 g. (0.014 mole) of diphenylacetyl chloride in 20 ml. of dry benzene. After refluxing for 3 hours, the solution was evaporated to dryness. The gummy residue was made alkaline with aqueous sodium carbonate and extracted with ether. The ether extract was washed with water, dried with sodium sulfate and saturated with dry hydrogen bromide gas. A gum precipitated out. The ether was distilled off and the residue crystallized from methanol-acetone-ether to give 4.3 g. of the crystalline hydrobromide of $N^1$-diphenylacetyl-$N^1,N^2$-diisopropyl-$N^2$-methyl - 1 - phenylethylenediamine, M. P. 205°–207°.

EXAMPLE 4

$N^1$-diphenylacetyl-$N^2$-n-butyl-$N^1,N^2$-dimethyl-1-phenylethylenediamine 30 g. (0.25 mole) styrene oxide and 44 g. (0.5 mole) methyl n-butylamine were refluxed for 8 hours. The mixture was then fractionally distilled, to give 42 g. of 1-phenyl-2-n-butylmethylaminoethanol, B. P. $_{0.9}$ 120°.

40.8 g. (0.197 mole) of 1-phenyl-2-n-butylmethylaminoethanol was dissolved in 100 ml. chloroform, the solution saturated with dry hydrogen chloride gas, cooled to 4° and mixed with 73 ml. (1 mole) of thionyl chloride (precooled to 4°). The solution was stored at 4° for 3 hours, after which the chloroform and excess thionyl chloride were removed by vacuum distillation at a bath temperature not exceeding 40°. The reaction residue thus obtained was triturated with ether and crystallized from acetone-ether, to give 44 g. of the hydrochloride of 1-phenyl - 1 - chloro-2-n-butylmethylaminoethane, M. P. 129°–130°.

44 g. (0.17 mole) of the hydrochloride of 1-phenyl-1-chloro-2-n-butylmethylaminoethane and 290 ml. of a methanol solution containing 18 per cent (by weight) of methylamine were heated in a closed vessel at 115° for 18 hours. The volatiles were then distilled off, the residue made alkaline with sodium hydroxide and extracted with ether. The ether extract was washed with water, dried over sodium sulfate and concentrated. The residual oil was fractionally distilled, giving 27 g. of $N^1,N^2$-dimethyl-$N^2$-n-butyl-1-phenylethylenediamine, B. P. $_{0.6}$ 94°.

To 2.2 g. (0.01 mole) of $N^1,N^2$-dimethyl-$N^2$-n-butyl-1-phenylethylenediamine, dissolved in 60 ml. of dry pyridine, was added a solution of 3.2 g. (0.014 mole) of diphenylacetyl chloride in 20 ml. of dry benzene. After refluxing for 3 hours, the solution was evaporated to dryness. The gummy residue was made alkaline with aqueous sodium carbonate and extracted with ether. The ether extract was washed with water, dried with sodium sulfate and saturated with dry hydrogen bromide gas. The solid that precipitated out was filtered off and crystallized from methanol-acetone-ether, giving 3.5 g. of the crystalline hydrobromide of $N^1$-diphenylacetyl - $N^2$ - n - butyl-$N^1,N^2$-dimethyl-1-phenylethylenediamine, M. P. 214°–215°.

5.0 g. (0.01 mole) of the hydrobromide of $N^1$-diphenylacetyl - $N^2$ - n - butyl-$N^1,N^2$-dimethyl-1-phenylethylenediamine was suspended in cold, dilute sodium carbonate, ether added and the mixture thoroughly shaken until all the solid particles were in solution. The ether layer was separated off, washed with water, dried over sodium sulfate and then concentrated. The residual oil was dissolved in 50 ml. of a 40 per cent solution of methyl bromide in acetone and the solution stored at room temperature. After 48 hours, enough ether was added to the solution to make it turbid, and crystallization was induced by scratching. After storing the mixture at 4° for a few hours, the white crystals were filtered off and recrystallized from methanol-acetone-ether, giving 3.7 g. of crystalline methobromide of $N^1$-diphenylacetyl-$N^2$-n-butyl - $N^1$ - $N^2$-dimethyl-1-phenylethylenediamine, M. P. 167°–169°.

EXAMPLE 5

$N^1$-(diphenylacetyl)-$N^1,N^2,N^2$-trimethyl-1-phenyl-1,2-propanediamine 1.9 g. (0.01 mole) of $N^1,N^2,N^2$-trimethyl-1-phenyl-1,2-propanediamine [Benoit and Herzog, Bull. Sci. Pharmacol. 42, 104 (1935)], dissolved in 60 ml. of dry pyridine, was added to a solution of 3.2 g. (0.014 mole) of diphenylacetyl chloride in 20 ml. of dry benzene. The solution, after refluxing for 3 hours was evaporated to dryness. The gummy residue was made alkaline with aqueous sodium carbonate and extracted with ether. The ether extract was washed with water, dried with sodium sulfate and saturated with dry hydrogen chloride gas. A gum precipitated out. The ether was distilled off and the residue crystallized from acetonitrile-ether, giving 1.9 g. of the hydrochloride of $N^1$-diphenylacetyl-$N^1,N^2,N^2$-trimethyl-1-phenyl-1,2-propanediamine, M. P. 238°–240° with dec.

By treating this hydrochloride with aqueous sodium hydroxide, the free base was obtained as a crystalline material from ether-hexane, M. P. 106°–107°.

EXAMPLE 6

$N^1$-diphenylacetyl-$N^2$-isopropyl-$N^2,N^2$-dimethyl-1-phenyl-1,2-propanediamine 53.7 g. (0.3 mole) of N-methylephedrine were dissolved in 200 ml. chloroform. At 4°, while stirring, a solution of 160 ml. of purified thionyl chloride in 150 ml. of chloroform was slowly added. The clear orange solution was stirred 1 hour at 4°, then 2 hours at room temperature. The solution was taken to dryness in vacuo at a bath temperature not exceeding 50°, and the cooled residue made alkaline with cold sodium carbonate and quickly extracted with ether. The ether extract was washed with cold water, dried with sodium sulfate and the ether distilled off, leaving 39 g. of a yellow oil which partially crystallized. The crystals were filtered off and recrystallized from hexane, giving 12.1 g. of 1-phenyl-1-chloro-2-dimethylaminopropane, M. P. 62°–63°.

7.4 g. (0.038 mole) of 1-phenyl-1-chloro-2-dimethylaminopropane and 20 ml. of isopropylamine in 20 ml. of absolute methanol were heated in a sealed vessel at 120° for 18 hours. The reaction mixture was evaporated to dryness, the residue made alkaline with aqueous sodium hydroxide and extracted with ether. The ether extract was washed with water, dried over sodium sulfate and the ether distilled off. The residual basic oil was dissolved in methanol and dry hydrogen chloride gas bubbled in until the solution was acid to Congo-red. The solution was then taken to dryness and the amorphous solid thus obtained was crystallized from methanol-ether, giving 7.7 g. of the dihydrochloride of $N^1$-isopropyl-$N^2,N^2$-dimethyl-1-phenyl-1,2-propanediamine, M. P. 243°–244°.

2.9 g. (0.01 mole) of the dihydrochloride of $N^1$-isopropyl-$N^2,N^2$-dimethyl-1-phenyl-1,2-propanediamine was dissolved in water, the solution made alkaline with sodium hydroxide and extracted with ether. The ether extract was washed with water, dried with sodium sulfate and the ether distilled off, leaving the diamine as a colorless oil. To the latter, dissolved in 60 ml. of dry pyridine, was added a solution of 3.2 g. (0.014 mole) of diphenylacetyl chloride in 20 ml. of dry benzene. After refluxing for 3 hours, the solution was evaporated to dryness. The gummy residue was made alkaline with aqueous sodium carbonate and extracted with ether. The ether extract was washed with water, dried with sodium sulfate and saturated with dry hydrogen bromide gas. A gum precipitated out. The ether was distilled off and the residue crystallized from isopropanol-ether, giving 2.4 g. of the crystalline hydrobromide of $N^1$-diphenylacetyl-$N^1$-isopropyl - $N^2,N^2$ - dimethyl - 1 - phenyl - 1,2 - propanediamine, M. P. 164°–166°.

EXAMPLE 7

$N^1$-diphenylacetyl-$N^1$-isopropyl-$N^2,N^2$-dimethyl-1-phenylethylenediamine 10.3 g. (0.05 mole) of the hydrochloride of 1-phenyl-1-chloro-2-dimethylamino-ethane [Bretschneider, Monatsh. 78, 96 (1948)] and 25 ml. of isopropylamine in 75 ml. of absolute methanol were heated in a sealed vessel at 120° for 18 hours. The reaction mixture was evaporated to dryness, the residue made alkaline with aqueous NaOH and extracted with ether. The ether extract was washed with water, dried over sodium sulfate and the ether distilled off. The residual basic oil was dissolved in methanol and acidified with dry hydrogen chloride gas. The solution was taken to dryness and the amorphous solid thus obtained was crystallized from methanol-ether, giving 9.3 g. of the dihydrochloride of $N^1$-isopropyl-$N^2,N^2$-dimethyl-1-phenylethylenediamine, M. P. 222°–224°.

2.8 g. (0.01 mole) of the dihydrochloride of $N^1$-isopropyl-$N^2,N^2$-dimethyl-1-phenylethylenediamine was dissolved in water, the solution made alkaline with NaOH and extracted with ether. The ether extract was washed with water, dried with sodium sulfate and the ether distilled off, leaving the diamine as an oil. To the latter dissolved in 60 ml. of dry pyridine, was added a solution of 3.2 g. (0.014 mole) of diphenylacetyl chloride in 20 ml. of dry benzene. After refluxing for 3 hours, the solution was evaporated to dryness. The gummy residue was made alkaline with aqueous sodium carbonate and extracted with ether. The ether extract was washed with water, dried with sodium sulfate and saturated with dry hydrogen chloride gas. The solid that precipitated out was filtered off and crystallized from acetone-ether, giving 3.9 g. of the crystalline hydrochloride of $N^1$-diphenylacetyl - $N^1$ - isopropyl - $N^2,N^2$ - dimethyl - 1 - phenylethylenediamine, M. P. 187°–189°.

EXAMPLE 8

$N^1$-Diphenylacetyl-$N^2$-ethyl-$N^1$-isopropyl-$N^2$-methyl-1-phenyl-1,2-propanediamine To a suspension of 118 g. (0.51 mole) of N-ethylephedrine hydrochloride in 236 ml. of chloroform at 4°, was added all at once, 134 ml. of thionyl chloride, precooled to 4°. After 10 minutes stirring at 4°, complete solution was obtained. After one-half hour, crystallization began. After 3 hours, the mixture was filtered and the crystals washed with ether. Recrystallization from isopropanol-ether gave 79 g. of the hydrochloride of 1-phenyl-1-chloro-2-(methylethylamino)-propane, M. P. 142°–145°.

7.4 g. (0.03 mole) of the hydrochloride of 1-phenyl-1-chloro-2-(methylethylamino)-propane and 25 ml. of isopropylamine in 75 ml. of absolute methanol were heated in a sealed vessel at 120° for 18 hours. The reaction mixture was evaporated to dryness, the residue made alkaline with aqueous NaOH and extracted with ether. The ether extract was washed with water, dried over sodium sulfate and the ether distilled off. The residual basic oil was dissolved in methanol and acidified with dry hydrogen chloride gas. The solution was taken to dryness and the amorphous solid thus obtained was crystallized from isopropanol-acetone-ether, giving 5.1 g. of the dihydrochloride of $N^2$-ethyl-$N^1$-isopropyl-$N^2$-methyl-1-phenyl-1,2-propanediamine, M. P. 224°–227°.

3.1 g. (0.01 mole) of the dihydrochloride of $N^2$-ethyl-$N^1$-isopropyl-$N^2$-methyl-1-phenyl-1,2-propanediamine was dissolved in water, the solution made alkaline with sodium hydroxide and extracted with ether. The ether extract was washed with water, dried with sodium sulfate and the ether distilled off, leaving the diamine as a colorless oil. To the latter, dissolved in 60 ml. of dry pyridine, was added a solution of 3.2 g. (0.014 mole) of diphenylacetyl chloride in 20 ml. of dry benzene. After refluxing for 3 hours, the solution was evaporated to dryness. The gummy residue was made alkaline with aqueous sodium carbonate and extracted with ether. The ether extract was washed with water, dried with sodium sulfate and saturated with dry hydrogen bromide gas. A gum precipitated out. The ether was distilled off and the residue crystallized from isopropanol-ether, giving 2.2 g. of the hydrobromide of $N^1$-diphenylacetyl-$N^2$-ethyl-$N^1$-isopropyl-$N^2$-methyl-1-phenyl-1,2-propanediamine, M. P. 186°–188°.

EXAMPLE 9

$N^1$-Diphenylacetyl-$N^1,N^2$-dimethyl-$N^2$-ethyl-1-phenyl-1,2-propanediamine 7.4 g. (0.03 mole) of the hydrochloride of 1-phenyl-1-chloro - 2 - (methylethylamino) - propane (preparation shown in Example 8) and 35 ml. of a 26% solution of methylamine in methanol were heated in a sealed vessel at 120° for 18 hours. The reaction mixture was evaporated to dryness, the residue made alkaline with aqueous NaOH and extracted with ether. The ether extract was washed with water, dried over sodium sulfate and the ether distilled off. The residual basic oil was dissolved in methanol and acidified with dry hydrogen chloride gas. The solution was taken to dryness and the amorphous solid thus obtained was crystallized from methanol-acetone-ether, giving the dihydrochloride of $N^1,N^2$-dimethyl-$N^2$-ethyl-1-phenyl-1,2-propanediamine, M. P. 219°–221°.

2.8 g. (0.01 mole) of the dihydrochloride of $N^1,N^2$-dimethyl-$N^2$-ethyl-1-phenyl-1,2-propanediamine was dissolved in water, the solution made alkaline with sodium hydroxide and extracted with ether. The ether extract was washed with water, dried with sodium sulfate and the ether distilled off, leaving the diamine as a colorless oil. To the latter, dissolved in 60 ml. of dry pyridine, was added a solution of 3.2 g. (0.014 mole) of diphenylacetyl chloride in 20 ml. of dry benzene. After refluxing for 3 hours, the solution was evaporated to dryness. The gummy residue was made alkaline with aqueous sodium carbonate and extracted with ether. The ether extract was washed with water, dried with sodium sulfate and saturated with dry hydrogen bromide gas. A gum precipitated out. The ether was distilled off and the residue crystallized from acetonitrile-ether, giving 2.1 g. of the hydrobromide of $N^1$-diphenylacetyl-$N^1,N^2$-dimethyl-$N^2$-ethyl-1-phenyl-1,2-propanediamine, M. P. 219°–220°.

EXAMPLE 10

$N^1$-Diphenylacetyl-$N^1,N^2$-diisopropyl-$N^2$-methyl-1-phenyl-1,2-propanediamine To a suspension of 17 g. (0.07 mole) of N-isopropylephedrine hydrochloride in 50 ml. of chloroform at 4°, was added all at once, 25 ml. of thionyl chloride, precooled to 4°. After 10 minutes stirring at 4°, complete solution was obtained. After one-half hour, crystallization began. After 3 hours, the mixture was filtered and the crystals washed with ether, giving 11.7 g. of the hydrochloride of 1 - phenyl - 1 - chloro-2-(methylisopropylamino) propane, M. P. 136°–138°.

5.2 g. (0.02 mole) of the hydrochloride of 1-phenyl-1-chloro-2-(methylisopropylamino) propane and 25 ml. of isopropylamine in 20 ml. of absolute methanol were heated in a sealed vessel at 120° for 18 hours. The reaction mixture was evaporated to dryness, the residue made alkaline with aqueous NaOH and extracted with ether. The ether extract was washed with water, dried over sodium sulfate and the ether distilled off. The residual basic oil was dissolved in methanol and acidified with dry hydrogen bromide gas. The solution was taken to dryness and the amorphous solid thus obtained was crystallized from methanol-isopropanol-ether, giving 6.4 g. of the dihydrobromide of $N^1,N^2$-diisopropyl-$N^2$-methyl-1-phenyl-1,2-propanediamine, M. P. 218°–221°.

4.1 g. (0.01 mole) of the dihydrobromide of $N^1,N^2$-diisopropyl-$N^2$-methyl-1-phenyl-1,2-propanediamine was dissolved in water, the solution made alkaline with sodium hydroxide and extracted with ether. The ether extract was washed with water, dried with sodium sulfate and the ether distilled off, leaving the diamine as a colorless oil. To the latter dissolved in 60 ml. of dry pyridine, was added a solution of 3.2 g. (0.014 mole) of diphenylacetyl chloride in 20 ml. of dry benzene. After refluxing for 3 hours, the solution was evaporated to dryness. The gummy residue was made alkaline with aqueous sodium carbonate and extracted with ether. The ether extract was washed with water, dried with sodium sulfate and saturated with dry hydrogen bromide gas. A gum precipitated out. The ether was distilled off, and the residue crystallized from water-acetone-ether, giving 3.4 g. of the hydrobromide of $N^1$-diphenylacetyl-$N^1,N^2$-diisopropyl-$N^2$-methyl-1-phenyl-1,2-propanediamine, M. P. 174°–176°.

We claim:

1. A compound selected from the group consisting of $N^1$-diphenylacetyl-$N^1,N^2,N^2$-triloweralkyl-1-phenylethylenediamines, $N^1$-diphenylacetyl-$N^1,N^2,N^2$-triloweralkyl-1-phenyl-1,2-propanediamines, and the pharmaceutically acceptable acid addition salts of the aforementioned compounds.

2. $N^1$ - Diphenylacetyl-$N^1,N^2,N^2$-trimethyl-1-phenyl-1,2-propanediamine.

References Cited in the file of this patent
UNITED STATES PATENTS

| | | |
|---|---|---|
| 2,009,144 | Miescher et al. | July 23, 1935 |
| 2,514,380 | Duschinsky | July 11, 1950 |
| 2,530,126 | Kwartler et al. | Nov. 14, 1950 |